United States Patent [19]

Takahashi

[11] Patent Number: 5,202,920
[45] Date of Patent: Apr. 13, 1993

[54] FACSIMILE EQUIPMENT HAVING A SECURE COMMUNICATION FUNCTION

[75] Inventor: Hideaki Takahashi, Nagoya, Japan

[73] Assignee: Brother Kogyo Kabushiki Kaisha, Nagoya, Japan

[21] Appl. No.: 783,885

[22] Filed: Oct. 29, 1991

[30] Foreign Application Priority Data

Nov. 26, 1990 [JP] Japan .................................. 2-323559

[51] Int. Cl.$^5$ .............................................. H04N 1/44
[52] U.S. Cl. ..................................................... 380/18
[58] Field of Search ........................ 380/18, 23, 48, 49, 380/42

[56] References Cited

U.S. PATENT DOCUMENTS 4,323,921  4/1982  Guillou .................................. 380/18
4,956,863  9/1990  Goss ..................................... 380/18

Primary Examiner—David Cain
Attorney, Agent, or Firm—Oliff & Berridge

[57] ABSTRACT

The present invention relates to a facsimile apparatus with the ability of secure communication. The apparatus comprises a ten-key set for entering cipher key data used in secure communication, a RAM for holding the cipher key data, a DTMF signal transmission/reception circuit which sends the cipher key data held in the RAM to the receiving unit or receives the cipher key data from the sending unit over the telephone line, and a control circuit which, if the received cipher key data is found to be defective, requests the sending unit to send the cipher key data again. The sending unit transfers the cipher key which has been set only in the sending unit to the receiving unit so that it is set in the receiving unit, whereby enhanced secure communication can be established between the sending and receiving facsimile units.

18 Claims, 5 Drawing Sheets

FACSIMILE EQUIPMENT HAVING A SECURE COMMUNICATION FUNCTION

BACKGROUND OF THE INVENTION

1. Field of the Invention

The present invention relates to facsimile equipment for enabling secure communications.

2. Description of Related Art

Conventionally, there exists facsimile equipment that secures clear text communication by allowing transmission only between machines that recognize a password transmitted at the beginning of the message. This is known as a password communication function.

In the password communication function, operators on the transmitter side and the receiver side arrange, ahead of the facsimile communication, to use the same password. The arrangement may be made by telephone, mail or other communication means. The operators individually input the same password into the respective facsimile equipment, thus assuring that the password on the transmitter side is in accord with the password on the receiver side, so that the message is only transmitted to a machine that recognizes and accepts the lead password.

Thus, the password communication function permits communication only between parties having the same password resident in their facsimile equipment. Accordingly, in the event that either operator makes an error in setting the password, secure communication between the parties becomes impossible.

SUMMARY OF THE INVENTION

The present invention is intended to overcome the foregoing problem, and its prime object is to provide a facsimile apparatus used in the facsimile communication system in which a sending facsimile unit transfers a cipher key, which has been set only in the sending unit, to a receiving facsimile unit so that it is set in the receiving unit, thereby establishing an enhanced secure communication.

In order to achieve the above object, the facsimile apparatus having the inventive secure communication function comprises input means for entering cipher key data used in the secure communication, memory means for holding the cipher key data entered through the input means, data transmission means for sending the cipher key data held in the memory means to the receiving party, data reception means for receiving the cipher key data sent from the sending party, cipher verification means for verifying as to whether the cipher key data sent from the sending party is correct and complete, and means of generating a recurrent transfer request signal and sending it to the sending party in the event of detection of defective cipher key data by the cipher verification means.

In the inventive facsimile apparatus arranged as described above, the cipher key data entered through the input means is held in the memory means. The cipher key data held in the memory means is sent to the receiving party by the data transmission means. The cipher key data sent from the sending party is received by the data reception means of the receiving party. The cipher verification means verifies whether the cipher key data sent from the sending party is correct and complete. If the cipher verification means determines the cipher key data to be defective, the recurrent transfer request signal generation means sends a recurrent transfer request signal for the cipher key to the sending party.

BRIEF DESCRIPTION OF THE DRAWINGS

A preferred embodiment of the present invention will be described in detail with reference to the accompanying drawings, of which.

DESCRIPTION OF THE PREFERRED EMBODIMENT

The facsimile apparatus based on an embodiment of the present invention will be described with reference to the drawings.

Figure 1:
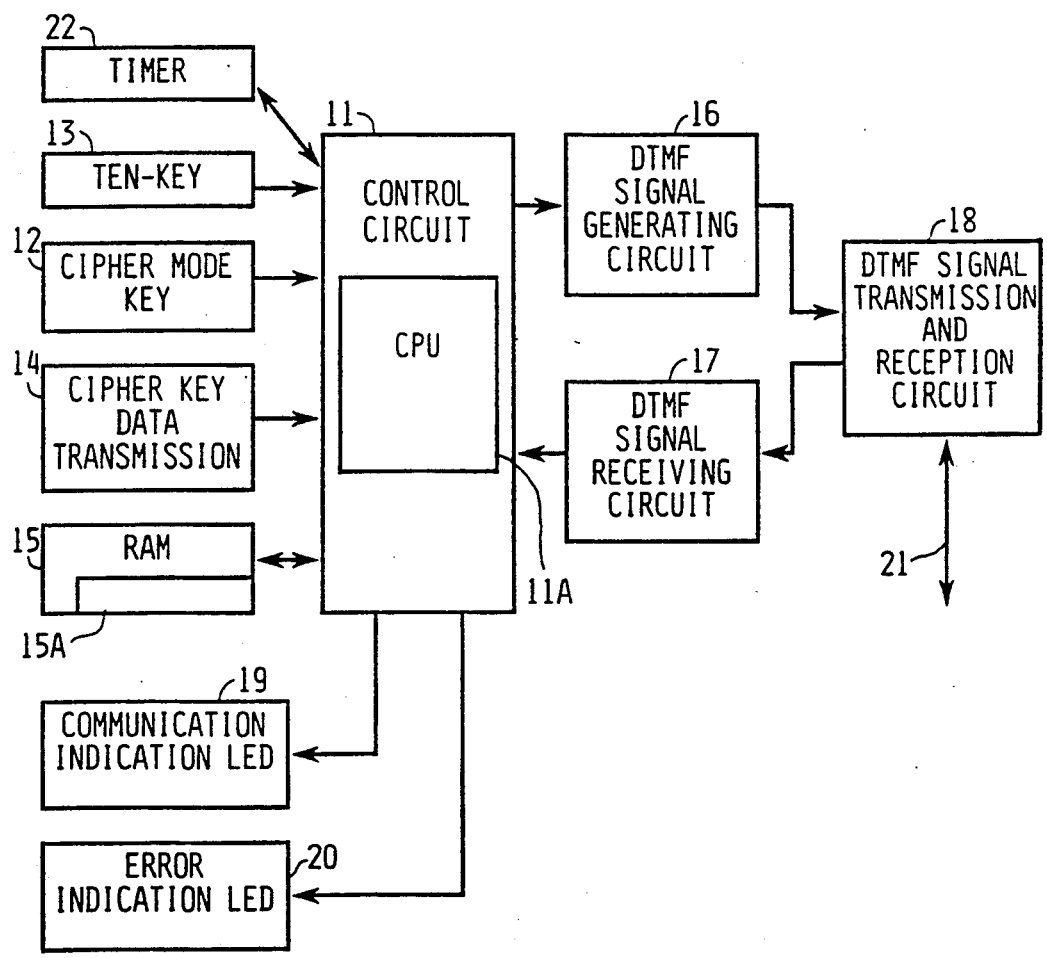
FIG. 1 is a block diagram showing the arrangement of the facsimile apparatus based on this embodiment.

Initially, the arrangement of the facsimile apparatus based on this embodiment will be explained. FIG. 1 is a block diagram showing the arrangement of the facsimile apparatus. This embodiment uses the DTMF (Dual Tone Multi-Frequency) signal for the communication signal. The DTMF signal is a signal in which two unmodulated signals are merged, and it is generally used for the PB (Push Button) dial signal of the telephone system. This embodiment also uses cipher key data.

The facsimile apparatus comprises a control circuit 11, a cipher mode selection key 12, a ten-key set 13, a cipher key transfer command key 14, a RAM 15, a DTMF signal generation circuit 16, a DTMF signal reception circuit 17, a DTMF signal transmission/reception circuit 18 for interfacing with the telephone line, a communication indicator light emitting diode (LED) 19, an error indicator LED 20, and a timer 22. Other circuits and functional blocks included in the facsimile apparatus, which are not related directly to the present invention, will not be explained here. The control circuit 11 is connected with the cipher mode selection key 12, ten-key set 13, cipher key transfer command key 14, RAM 15, DTMF signal generation circuit 16, DTMF signal reception circuit 17, communication indicator LED 19, error indicator LED 20, and timer 22. The DTMF signal transmission/reception circuit 18 is connected with the DTMF signal generation circuit 16 and DTMF signal reception circuit 17.

The control circuit 11 incorporates a CPU 11A, and it executes programs stored in it as shown by the flowcharts which will be explained later.

The cipher mode selection key 12 is to select the operating mode of the facsimile unit. When the key 12 is pressed for the first time, the sending facsimile unit enters the cipher key data registration mode, in which cipher key data 23 (FIG. 2) can be entered on the ten-key set 13. When the key 12 is pressed for the second time, the sending facsimile unit enters the cipher key transfer mode, in which it is ready to send the cipher key 25 to the receiving facsimile unit.

The ten-key set 13 is used to enter the cipher key data 23 and the facsimile number of the receiving facsimile unit. At the beginning of the secure communication, the sending person enters the cipher key data 23 on the ten-key set 13.

The cipher key transfer command key 14 is used to start the transmission of the cipher key 25. When the sending person enters the facsimile number of the receiving facsimile unit on the ten-key set 13, and then presses the cipher key transfer command key 14, the sending facsimile unit connects the telephone line 21 to the receiving facsimile unit, and starts the transmission of the cipher key 25 to the receiving facsimile unit.

The RAM 15 has a buffer area 15A, in which the cipher key data 23 entered through the ten-key set 13 and an error check code 24 produced from the cipher key data 23 are stored. The RAM buffer area 15A also holds like information sent from other facsimile units.

The DTMF signal generation circuit 16 transforms the cipher key 25 read out of the RAM buffer area 15A by the control circuit and image data, which will be explained later, into a DTMF signal and passes it to the DTMF signal transmission/reception circuit 18.

The DTMF signal reception circuit 17 transforms the DTMF signal received by the DTMF signal transmission/reception circuit 18 into a cipher key 25 and image data and passes them to the control circuit 11. The cipher key 25 transferred from the DTMF signal transmission/reception circuit 17 to the control circuit 11 is held temporarily in the buffer area 15A of the RAM 15.

The DTMF signal transmission/reception circuit 18 transmits the DTMF signal, which is provided by the DTMF signal generation circuit 16, over the telephone line 21, and it also transfers a DTMF signal received from the other facsimile unit over the telephone line 21 to the DTMF signal reception circuit 17.

The communication indicator LED 19 is driven by the output of the control circuit 11, and it indicates that the cipher key communication is taking place. The error indicator LED 20 is driven by another output of the control circuit and it indicates that the sending facsimile unit has failed to transfer the cipher key 25 to the receiving facsimile unit.

The timer 22 has its time count operation started by the control circuit 11 when the DTMF signal transmission/reception circuit 18 has completed the DTMF signal transmission over the telephone line 21. It is terminated and the time count is cleared by the control circuit 11 in response to the reception of a cipher key coincidence signal 27 or a cipher key recurrent transfer request signal 26 from the receiving facsimile unit within a predetermined time limit. If any of the coincidence signal and request signal are not sent from the receiving facsimile unit within the predetermined time limit set by the timer 22, the timer 22 issues a time expiration signal to the control circuit The control circuit responds to the expiration signal to clear the timer 22. The control circuit 11 disconnects the telephone line 21 which has been established between the sending and receiving facsimile units, and activates the error indicator LED 20.

Figure 2:
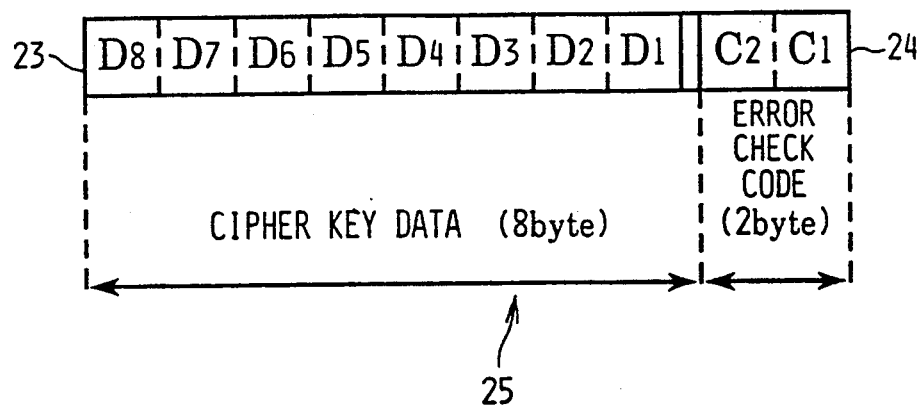
FIG. 2 is a diagram showing the communication data frame format of the cipher key based on this embodiment.

Next, the cipher key data 23 and error check code 24 based on this embodiment will be explained with reference to the data frame format of this information shown in FIG. 2.

The cipher key data 23 consists of eight bytes D8-D1, i.e., in 16-digit length. Each hexadecimal digit is formed of 4 bits. The cipher key data 23 is accompanied by a 4-digit (2-byte) error check code C2-C1 which is derived from, for example, the low-order four digits of the sum of all digits of the cipher key data 23. Accordingly, the data frame consists of 10 bytes, including the cipher key data 23 and error check code 24. The data frame formed of the cipher key data 23 and error check code 24 will be termed "cipher key 25" in the following.

Figure 3:
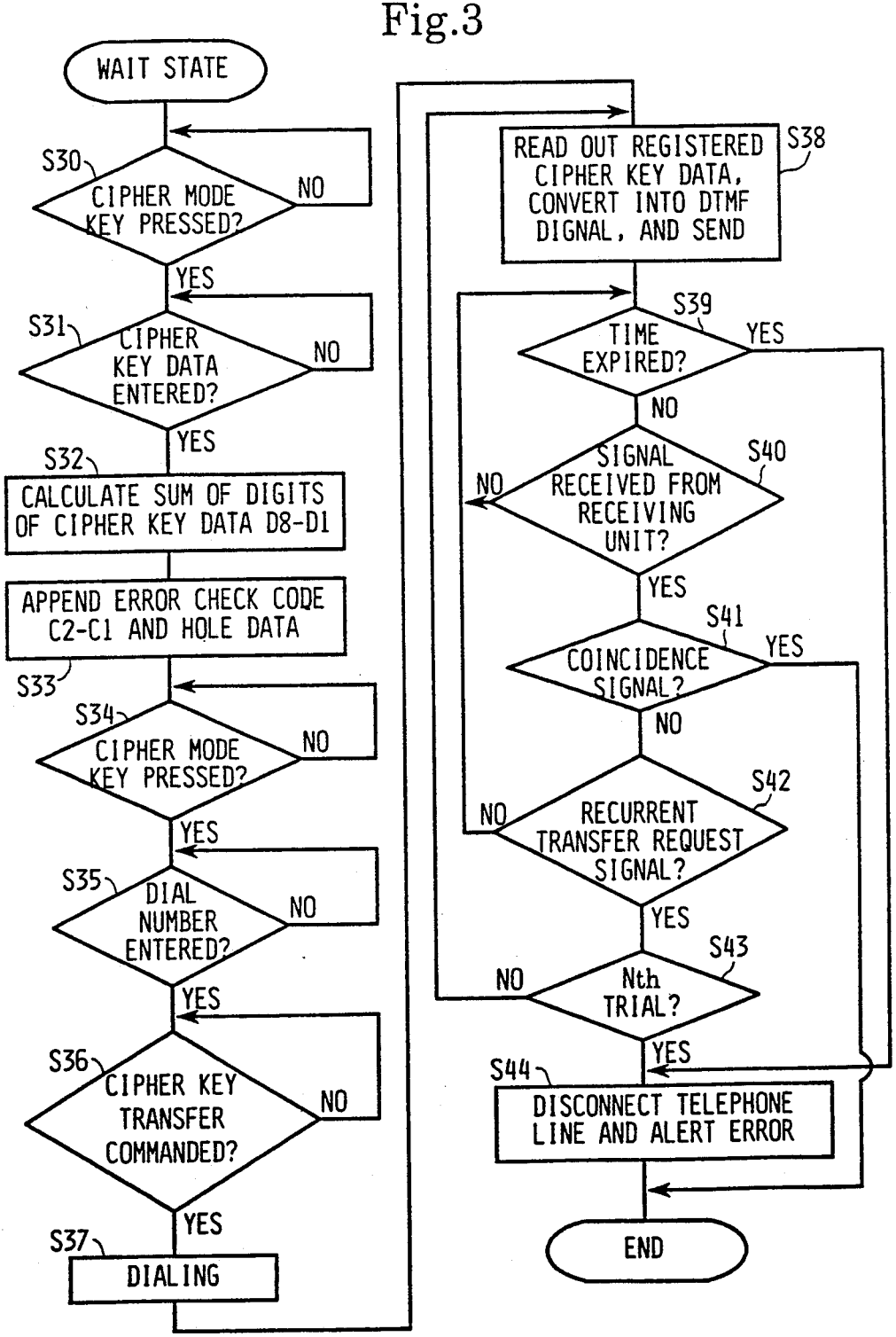
FIG. 3 is a flowchart showing the procedure of cipher key transmission implemented by the sending facsimile unit based on this embodiment.

Next, the procedures of cipher key transmission and reception based on this embodiment will be explained with reference to FIGS. 1 through 4. FIG. 3 is a flowchart showing the procedure of cipher key transmission and FIG. 4 is a flowchart showing the procedure of cipher key reception implemented by the facsimile apparatus of this embodiment.

The following is the explanation based on FIG. 3 for the operation of the sending facsimile unit. Initially, the sending facsimile unit is already turned on and it is in a wait state for the entry of the cipher mode selection key 12 (step 30: No). The sending person who intends to send a secure communication presses the cipher mode selection key 12. This key operation is sensed by the control circuit 11 (step 30: Yes), and it turns from the wait mode to the cipher key data registration mode. The control circuit 11 waits for the entry of cipher key data 23 on the ten-key set 13 (step 31: No). The sending person randomly keys the ten-key set 13 sixteen times to enter cipher key data 23 (step 31: Yes), and then the cipher key data 23 is released by the control circuit 11 and held temporarily in the buffer area 15A of the RAM 15. The control circuit 11 reads the 16-digit cipher key data 23 out of the buffer area 15A of the RAM 15, and calculates the sum of values of all digits (step 32) thereby to produce an error check code 24. The error check code 24 is, for example, the low-order four digits of the sum of all digits of the cipher key data 23, as mentioned previously. The error check code 24 is held together with the cipher key data 23 in the buffer area 15A of the RAM 15 (step 33). The cipher key data 23 and error check code 24 in conjunction constitute the cipher key 25.

The control circuit 11 waits for the depression of the cipher mode selection key 12 (step 34: No). When the sending person presses the cipher mode selection key 12 the second time, it is sensed by the control circuit 11 (step 34: Yes), and it turns from the cipher key data registration mode to the data sending mode. The control circuit 11 waits for the entry of the facsimile number of the receiving facsimile unit (step 35: No). When the sending person completes the entry of the facsimile number of the receiving facsimile unit (step 35: Yes), the control circuit 11 waits for the entry of the cipher key transfer command 14 (step 36: No). Depression of the command key 14 by the sending person is sensed by the control circuit (step 36: Yes), and it implements dialing of the facsimile number of the receiving facsimile unit (step 37). In entering the facsimile number of the receiving party, the sending person may use the ten-key set 13 or may use an abbreviated number entry key (not shown). When the receiving facsimile unit is linked through the telephone line 21 as a result of dialing, the control circuit 11 reads the cipher key 25 out of the buffer area 15A of the RAM 15 and sends it to the DTMF signal generation circuit 16. On receiving the cipher key 25, the DTMF signal generation circuit 16 transforms the cipher key 25 into a corresponding DTMF signal, which is then transmitted by the control circuit 11 to the receiving facsimile unit (step 38). At the same time, the control circuit operates on the timer 22 to start counting. The sending facsimile unit enters the wait state of a prescribed duration, e.g., 30 seconds, for receiving the cipher key coincident signal or recurrent transfer request signal from the receiving facsimile unit. During the transmission of the DTMF signal by the DTMF signal generation circuit 16, the control circuit activates the communication indicator LED 19, notifying the sending person that the sending facsimile unit is sending the cipher key 25 to the receiving facsimile unit. The order of data transmission is D8, D7, D6, ..., D1 of the cipher key data 23 and then C2 and C1 of the error check code 24, in this embodiment.

Figure 4:
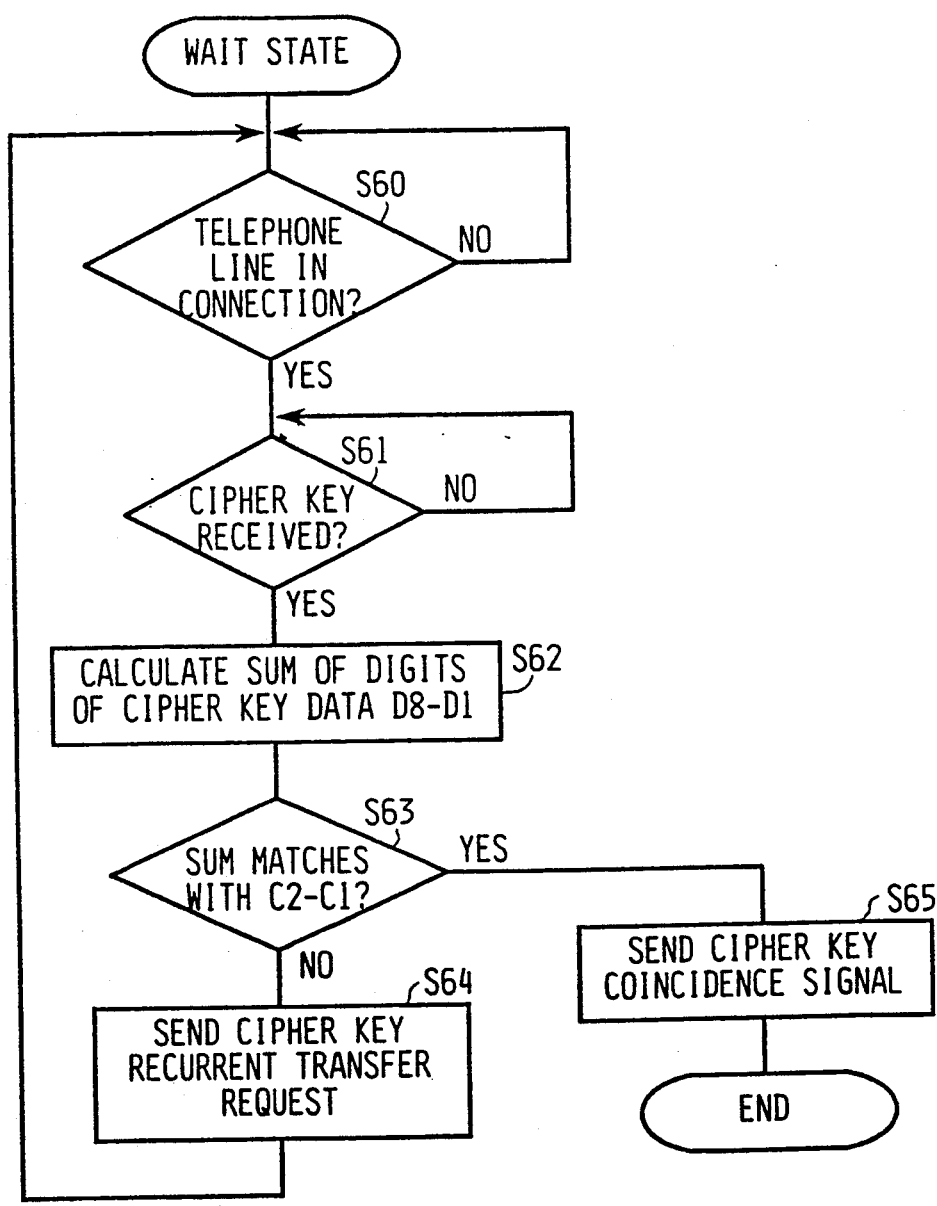
FIG. 4 is a flowchart showing the procedure of cipher key reception implemented by the receiving facsimile unit based on this embodiment.

The following is the explanation based on FIG. 4 for the operation of the receiving facsimile unit. Initially, the receiving facsimile unit is already turned on and it is in a wait state for the line connection (step 60: No). As a result of the dialing operation by the sending facsimile unit, the control circuit 11 of the receiving facsimile unit detects the connection of the telephone line 21 between the sending and receiving facsimile units (step 60: Yes), and it operates on its DTMF signal transmission/reception circuit 18 to start the reception of the DTMF signal sent from the sending facsimile unit (step 61: No). By detecting the completion of reception by the DTMF signal transmission/reception circuit of the DTMF signal sent from the sending facsimile unit (step 61: Yes), the control circuit 11 operates on the DTMF reception circuit 17 to transform the received DTMF signal back to the original cipher key 25, i.e., cipher key data 23 and error check code 24. The control circuit temporarily holds the resulting cipher key data 23 and error check code 24 in the buffer area 15A of the RAM 15. Next, the control circuit 11 reads the cipher key data 23 out of the buffer area 15A of the RAM 15, and sums all digits of the 16-digit cipher key data 23 (step 62). Subsequently, the control circuit 11 reads the error check code 24 as a first error check code out of the buffer area 15A of the RAM 15, and compares it with the calculated sum as a second error check code (step 64). By detecting the coincidence between the sum and the error check code 24 (step 63: Yes), indicative of normal reception of the cipher key, the control circuit 11 operates on its DTMF signal transmission/reception circuit 18 to send a certain cipher key coincidence signal 27 to the counterpart circuit 18 of the sending facsimile unit (step 65). This coincidence signal 27 may be a special DTMF signal or may be an acoustic signal of a certain frequency. The control circuit sets the cipher key 25 to the receiving facsimile unit. The control circuit brings the receiving facsimile unit into the wait state until image data is sent from the sending facsimile unit. If the control circuit 11 detects the inequality between the sum and the error check code 24 (step 63: No), indicative of abnormal reception of the cipher key 25, it operates on the its DTMF signal transmission/reception circuit to send a cipher key recurrent transfer request signal 26 to the counterpart circuit 18 of the sending facsimile unit (step 65). This request signal 26 may be a special DTMF signal different from the cipher key coincidence signal 27 or may be an acoustic signal of a certain frequency different from the coincidence signal 27.

The following explanation is for the operation implemented by the sending facsimile unit shown in FIG. 3. After the control circuit has sent the DTMF signal derived from the cipher key 25 in step 38, it operates on the timer 22 to start counting and enters the wait state of 30 seconds for the reception of the cipher key coincidence signal 27 or cipher key recurrent transfer request signal 26 from the receiving facsimile unit (steps 39, 40: No). When 30 seconds has expired since the commencement of time count by the timer 22, it issues a time expiration signal to the control circuit In response to the expiration signal from the timer 22, the control circuit 11 disconnects the telephone line 21 between the sending and receiving facsimile units and activates the error indicator LED 20.

The control circuit upon reception of any signal by the sending facsimile unit from the receiving facsimile unit within the 30-second wait state (step 40: Yes), subsequently analyzes whether or not the received signal is the cipher key coincidence signal 27 (step 41). On determining the signal to be the cipher key coincidence signal 27, indicative of normal transfer of the cipher key 25 to the receiving facsimile unit (step 41: Yes), the control circuit terminates the cipher key transfer operation. The control circuit 11 operates on the timer 22 to stop counting and clear the count. If the control circuit 11 determines that the received signal is not the cipher key coincidence signal 27 (step 41: No), it analyzes whether or not the signal is the recurrent transfer request signal (step 42). On determining the received signal to be the recurrent transfer request signal (step 42: Yes), the control circuit 11 operates on the timer 22 to stop counting and clear the count. The control circuit 11 further tests as to whether or not this is the Nth reception of the recurrent transfer request signal (step 43). The value of N is 3 in this embodiment. If the control circuit determines that the received recurrent transfer request signal is not the third one (step 43: No), it implements the operation of step 38 to send the cipher key 25 to the receiving facsimile unit and operates on the timer 22 to start counting. If, on the other hand, the control circuit 11 determines the recurrent transfer request signal to be the third one (step 43: Yes), it disconnects the telephone line 21 and activates the error indicator LED 20 thereby to notify the sending person of the failure of transfer of the cipher key 25 (step 44). The control circuit 11 operates on the timer 22 to stop counting and clear the count. If the control circuit determines the received signal to be not the recurrent transfer request signal (step 41: No), it returns to step 39 and waits for the reception of any signal from the receiving facsimile unit. The timer 22 continues counting in this case. In the embodiment described, the transfer of the cipher key 25 from the sending facsimile unit to the receiving facsimile unit takes place up to three times automatically. However, the number N can be any desired number of attempts and the expiration time of the timer 22 can be a value other than 30 seconds.

When the control circuit of the sending facsimile unit disconnects the telephone line 21, it is detected by the counterpart circuit 11 of the receiving facsimile unit and the circuit waits for another connection of the telephone line 21 (step 60: No).

It is apparent from the above explanation that the cipher key data 23 which is set in the buffer area 15A of the RAM 15 of the sending facsimile unit should be identical to the cipher key data 23 which is set in the buffer area 15A of the RAM 15 of the receiving facsimile unit, and these data do not conflict with each other and thus can be used in the same manner as a password used for secure communication. This situation holds in the case of interchanging of the sending and receiving facsimile units, and the facsimile unit which has been the receiving party can now transfer the cipher key 25 to the buffer area 15A of the RAM 15 of the facsimile unit which has been the sending party in the same manner as described above.

With the same cipher key data 23 being set in both the sending and receiving facsimile units, as explained above, image data which is the content of communication is transmitted from the sending unit to the receiving unit. In the image data transmission, an exclusive-OR gate in the sending facsimile unit implements summation to modulus "2" between the cipher key data 23 and the image data so that the content of communication is scrambled, and the scrambled image data is transmitted to the receiving facsimile unit.

In the receiving facsimile unit, the control circuit 11 reads the cipher key data 23 out of its buffer area 15A of the RAM 15 and operates on its exclusive-OR gate to implement summation to modulus "2" so that the content of communication is descrambled to reproduce the original image data. Since the cipher key data 23 used in both the sending and receiving facsimile units are completely consistent, the descrambled image data at reception matches with the image data before scrambling at transmission. Image data sent over the telephone line 21 is scrambled, and therefore it is not possible to reveal the crude image data from the transmitted data, and image data transmission is kept secure. It is also possible for the sending party to encrypt the image data in advance and then transmit the encrypted data by scrambling and for the receiving party to descramble the content of communication and decrypt the data, and in this case the image data is treated in dual security.

Figure 6:
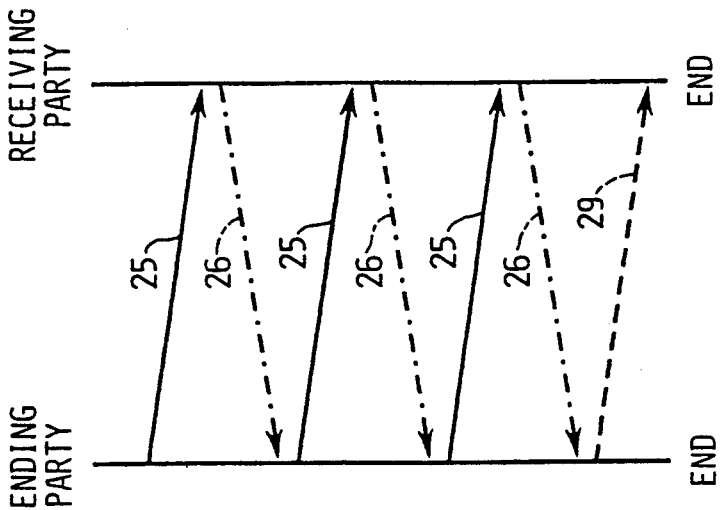
FIG. 6 is a diagram showing the signal exchange operation between the sending and receiving facsimile units in the event of failure of cipher key transfer based on this embodiment.
Figure 5:
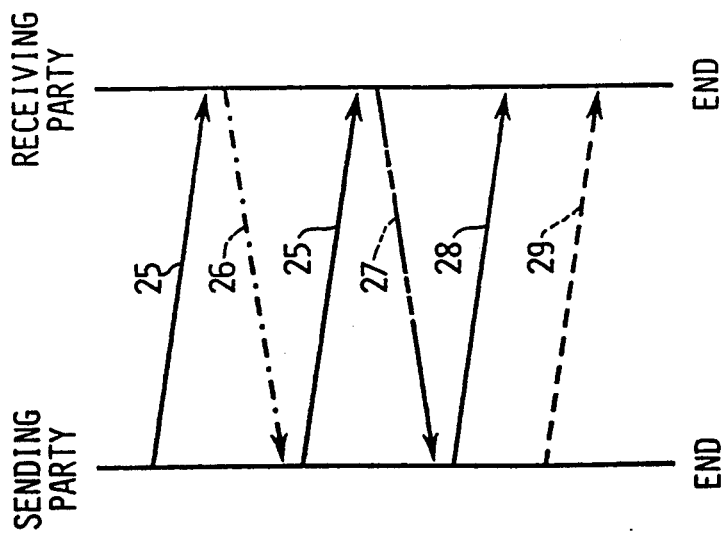
FIG. 5 is a diagram showing the signal exchange operation between the sending and receiving facsimile units at the successful cipher key transfer in the second trial based on this embodiment.

The following explains the signal exchange operation between the sending and receiving facsimile units based on this embodiment with reference to FIGS. 5 and 6. FIG. 5 shows signal exchange between the sending and receiving facsimile units of the case when the cipher key 25 is transferred successfully in the second trial, and FIG. 6 shows the case when transfer of the cipher key 25 fails eventually. In the figures, the transmission of the cipher key 25 and image data 28 is indicated by the solid line, the cipher key recurrent transfer request signal 26 is indicated by the dash/dot line, the cipher key coincidence signal 27 is indicated by the 2-dot/dash line, and telephone line disconnection 29 is indicated by the dashed line.

In FIG. 5, the sending facsimile unit tries a first transfer of the cipher key 25 to the receiving facsimile unit. This transmission fails and the cipher key 25 does not reach the receiving party normally. Then, the receiving facsimile unit sends a cipher key recurrent transfer request signal 26 to the sending facsimile unit. On receiving the first recurrent transfer request signal 26, the sending facsimile unit sends the cipher key 25 to the receiving facsimile unit again. This time the cipher key 25 is transferred successfully from the sending facsimile unit to the receiving facsimile unit, and the receiving facsimile unit sends the cipher key coincidence signal 27 back to the sending facsimile unit. On receiving the coincidence signal 27, the sending facsimile unit transmits encrypted image data 28 to the receiving facsimile unit, and thereafter it disconnects the telephone line 21 which has been connected with the receiving facsimile unit.

In FIG. 6, the sending facsimile unit tries a first transfer of the cipher key 25 to the receiving facsimile unit. This transmission fails and the cipher key 25 does not reach the receiving party normally. Then, the receiving facsimile unit sends a cipher key recurrent transfer request signal 26 to the sending facsimile unit. On receiving the first recurrent transfer request signal 26, the sending facsimile unit tries a second time to send the cipher key 25 to the receiving facsimile unit. However, this transmission fails again and the cipher key 25 does not reach the receiving party normally. Then, the receiving facsimile unit sends the cipher key recurrent transfer request signal 26 to the sending facsimile unit for the second time. On receiving the second recurrent transfer request signal 26, the sending facsimile unit tries a third time to send the cipher key 25 to the receiving facsimile unit. However, this transmission fails again and the cipher key 25 does not reach the receiving party normally. Then, the receiving facsimile unit sends the cipher key recurrent transfer request signal 26 to the sending facsimile unit for the third time. The sending facsimile unit recognizes the latest cipher key recurrent transfer request signal 26 to be the third trial, and it disconnects the telephone line 21 which has been established with the receiving facsimile unit and activates its error indicator LED 20. The sending person is notified by the lit error indicator LED 20 of the failure of secure communication.

The present invention is not confined to the embodiment described above in detail, but various changes can be made without departing from the scope of substantial matter. For example, failure of transfer of the cipher key may be notified to the sending person with a sound signal of a buzzer or in a print form, instead of indicating it with the error indicator LED 20 as illustrated in the foregoing embodiment. In addition, the control circuit 11 may be included in a microcomputer-based control circuit which controls the facsimile apparatus.

What is claimed is:

1. A facsimile apparatus having a secure communication function comprising:
    input means for entering cipher key data used in the secure communication;
    memory means for holding the cipher key data entered through said input means;
    data transmission means for sending the cipher key data held in said memory means to a receiving unit;
    data reception means for receiving the cipher key data sent from a sending unit;
    cipher verification means for verifying whether the cipher key data sent from said sending unit is complete; and
    means of generating a recurrent transfer request signal and sending it to a sending unit in the event of detection of defective cipher key data by said cipher verification means.

2. The facsimile apparatus according to claim 1, said facsimile apparatus further comprising check code calculating means for calculating a first error check code corresponding to the cipher key data input from said input means.

3. The facsimile apparatus according to claim 2, wherein said cipher verification means calculates a second error check code corresponding to cipher key data sent from a sending party, said cipher verification means verifying whether the cipher key data sent from said sending party is complete by comparing the first error check code with the second error check code.

4. The facsimile apparatus according to claim 1, said facsimile apparatus further comprising means for generating a receiving signal and sending it to said sending unit in the event of detection of complete cipher key data by said cipher verification means.

5. The facsimile apparatus according to claim 1, said facsimile apparatus further comprising information means for indicating a failure in sending the cipher key data.

6. The facsimile apparatus according to claim 5, said facsimile apparatus further comprising timer means for starting a time count when said data transmission means begins sending the cipher key data to a receiving unit, said timer means including means for clearing the time count in response to receipt of a predetermined signal by the sending unit and means for issuing a time expiration signal to said control means when said timer means has counted a predetermined time.

7. The facsimile apparatus according to claim 6, further comprising control means for receiving the time expiration signal from said timer means and enabling said information means.

8. The facsimile apparatus according to claim 5, wherein said information means comprises a light emission diode.

9. The facsimile apparatus according to claim 5, wherein said information means comprises means for giving an audible signal.

10. The facsimile apparatus according to claim 5, said facsimile apparatus further comprising counter means for counting the value of said recurrent transfer request signal sent from a receiving unit to a sending unit, said data transmission means comprising means for sending the cipher key data to the receiving unit again when the value of said recurrent transfer request signal is smaller than a predetermined value; and control means for enabling said information means when the value of said recurrent transfer request signal equals a predetermined value.

11. A facsimile apparatus having a secure communication function comprising:
   input means for entering cipher key data used in the secure communication;
   memory means for holding the cipher key data entered through said input means;
   check code calculating means for calculating a first error check code corresponding to the cipher key data input from said input means;
   data transmission means for sending the cipher key data and the first error check code held in said memory means to a receiving unit;
   data reception means for receiving cipher key data and first error check code sent from a sending unit;
   storing means for storing the cipher key data and first error check code sent from said sending unit;
   cipher verification means for calculating a second error check code corresponding to the cipher key data sent from said sending unit and for verifying whether the cipher key data sent from said sending party is complete by comparing the first error check code with the second error check code;
   means of generating a recurrent transfer request signal and sending it to said sending unit upon detection of defective cipher key data by said cipher verification means; and
   means of generating a receiving signal and sending it to said sending unit upon detection of complete cipher key data by said cipher verification means.

12. The facsimile apparatus according to claim 11, said facsimile apparatus further comprising information means for indicating failure of sending the cipher key data.

13. The facsimile apparatus according to claim 12, said facsimile apparatus further comprising timer means for starting a time count when said data transmission means begins sending the cipher key data to the receiving unit, said timer means including means for clearing the time count in response to receipt of a predetermined signal by the sending unit from a receiving unit and means for issuing an time expiration signal to said control means when said timer means has counted a predetermined time.

14. The facsimile apparatus according to claim 13, further comprising control means for receiving the time expiration signal from said timer means and enabling said information means.

15. The facsimile apparatus according to claim 12, wherein said information means comprises a light emission diode.

16. The facsimile apparatus according to claim 12, wherein said information means comprises means for giving an audible signal.

17. The facsimile apparatus according to claim 12, said facsimile apparatus further comprising counter means for counting the value of said recurrent transfer request signal sent from a receiving unit to a sending unit, said data transmission means sending the cipher key data to the receiving unit again when the value of said recurrent transfer request signal is smaller than a predetermined value; and control means for enabling said information means when the value of said recurrent transfer request signal equals a predetermined value.

18. The facsimile apparatus according to claim 11, said facsimile apparatus further comprising:
   transmission converting means for converting image signals into cipher signals corresponding to cipher key data stored in said memory means; and
   descrambling means for descrambling image signals in accordance with cipher key data stored in said storing means.

* * * * *